United States Patent
Young

(10) Patent No.: US 6,196,468 B1
(45) Date of Patent: Mar. 6, 2001

(54) AIR CONDITIONING AND HEATING ENVIRONMENTAL CONTROL SENSING SYSTEM

(76) Inventor: Dennis Guy Young, 75-4579 Mamalahoa Hwy., Kailua-Kona, HI (US) 96740

( * ) Notice: Subject to any disclaimer, the term of this patent is extended or adjusted under 35 U.S.C. 154(b) by 0 days.

(21) Appl. No.: 09/360,407

(22) Filed: Jul. 23, 1999

Related U.S. Application Data

(60) Provisional application No. 60/094,093, filed on Jul. 24, 1998.

(51) Int. Cl.$^7$ ............................. F23N 5/20; G05D 23/00
(52) U.S. Cl. ..................... 236/46 R; 62/131; 62/158; 165/237; 236/46 C; 236/51
(58) Field of Search ................ 236/46 A, 46 C, 236/46 R, 47, 51; 62/131, 157, 158, 180, 186, 231; 165/237

(56) References Cited

U.S. PATENT DOCUMENTS

| | | | |
|---|---|---|---|
| 4,203,301 | * | 5/1980 | Gill et al. ............................. 62/131 |
| 4,566,285 | * | 1/1986 | Tershak et al. ...................... 62/129 |
| 4,784,319 | * | 11/1988 | Kaiser ................................ 236/46 R |
| 4,863,099 | * | 9/1989 | King et al. ......................... 236/46 R |
| 4,948,045 | * | 8/1990 | Romano ................................ 236/51 |
| 5,524,448 | * | 6/1996 | Schwanebeck et al. ............... 62/231 |

* cited by examiner

*Primary Examiner*—Corrine McDermott
*Assistant Examiner*—Marc Norman
(74) *Attorney, Agent, or Firm*—Martin E. Hsia

(57) ABSTRACT

A device for controlling an HVAC system in which opening a door or window for more than a shutdown delay period causes the fan and compressor to be deactivated, but opening and closing the door or window for less than the shutdown delay period does not affect the fan and compressor. Reactivation of the compressor is delayed for a startup delay, in order to avoid overcycling of the compressor and the additional wear and tear and maintenance that would be caused thereby. Preferably, the door/window sensors are wireless for ease of installation and maintenance. Optionally, an occupancy sensor and occupancy timer are provided to turn off the system if the room is unoccupied for an unoccupied delay time. Optionally, a secondary thermostat with energy saving settings is provided so that if the room is unoccupied for the occupancy delay, then instead of being shut off, the HVAC system will be operated at energy saving settings.

7 Claims, 5 Drawing Sheets

AIR CONDITIONING AND HEATING ENVIRONMENTAL CONTROL SENSING SYSTEM

This application claims priority to U.S. provisional patent application Ser. No. 60/094,093, filed Jul. 24, 1998.

This invention relates to an apparatus and process for controlling heating, air conditioning, and ventilation (HVAC) and other environmental control systems to prevent excessive and wasteful electricity consumption and premature maintenance and replacement costs.

Air conditioning and heating systems are commonly used in both residential and commercial buildings, and are commonly controlled by thermostats. However, people using these systems may leave doors or windows open for fresh air or other reasons, therefore causing the air conditioning or heating system to operate at a nearly continuous level. This continuous operation of the air conditioning or heating system creates high electricity consumption and maintenance costs because leaving the door or window open will prevent the environment from reaching the temperature setting for the thermostat. This problem is especially acute in hotels and resort vacation rental facilities in which occupants are not responsible for, and probably are unaware of, high electricity, repair and maintenance costs. These costs are therefore borne by the owner or operator of the hotel, rental facility, or other building.

A related problem arises when the air conditioner or heater in a room is turned on in the morning and throughout the entire day, even though the room has been unoccupied.

BACKGROUND ART

U.S. Pat. No. 5,476,221 to Seymour, which is incorporated herein by reference, discloses a wireless thermostatic control system including a door sensor to detect whether a room door is open and a sensor to determine whether a room is occupied, with two thermostatic controls: one for a room occupant and one for an energy saving setback mode when the room is not occupied, as detected by an infrared sensor.

U.S. Pat. No. 4,391,406 to Fried, which is incorporated herein by reference, discloses a power saving unit containing a timer and two time delays. It also assures room security by requiring the door to be properly locked before particular electric loads will be energized.

U.S. Pat. No. 4,232,819 to Bost discloses the use of a control box mounted adjacent to a door which must be activated by the room user, permitting the user to control the thermostat.

U.S. Pat. No. 4,502,290 to Suzuki, et al., discloses an air conditioner which is controlled based on illumination detected by a photo detector.

U.S. Pat. No. 4,585,162 to Evans discloses an improved automatic energy temperature control system for a room involving a second thermostat which uses less heating or cooling, with the second thermostat activated by the entry or departure of persons from the room, sensed through a switch responsive to the presence of a door chain.

U.S. Pat. No. 4,719,763 to Tietze discloses an air conditioner having a control system arranged to start operation of the fan and the cooling circuit in response to a person entering the room, and to stop operation of the fan and the cooling system in response to a person leaving the room, as determined when a hotel guest unlocks the door of the room.

U.S. Pat. No. 5,285,961 to Rodriguez, Jr. discloses a means for preventing unnecessary expense in a heating, ventilation and air condition system by using two thermostats, one with fixed limits for ambient temperatures accessible only by authorized personnel, and the other having variable limits actuated to override the fixed limits when an infrared motion sensor unit detects movement and activates the variable limit thermostat.

U.S. Pat. No. 5,318,224 to Darby, et al., discloses an energy efficient system for controlling heating and cooling equipment in which the system can be operated at various levels depending on whether motion is detected or a control signal is received from a telephone.

U.S. Pat. No. 5,538,181 to Simmons, et al., discloses an air conditioner/heater which automatically turns off the power when the room is unoccupied, with minimal installation costs and rewiring, having a digital timer.

It is therefore an object of this invention to provide an apparatus and system for deactivating an air conditioner or heater when a window or door is open or when a room is unoccupied that requires minimal installation time, especially of electricians.

It is a further object of this invention to provide such an apparatus or system that avoids unnecessary wear upon the compressor unit in an air conditioner.

It is astill further object of the present invention to provide such an apparatus and system that uses readily available components.

It is a still further object of this invention to provide such an apparatus and system in which the system controls may be located anywhere within a building.

It is a still further object of the present invention to provide an apparatus and system that separately controls the evaporator fan and the compressor.

It is a still further object of the present invention to provide such an apparatus and system in which malfunctions can be easily and quickly diagnosed to reduce the costs of repair and maintenance.

It is a still further object of the present invention to provide such an apparatus and system that can be easily and economically installed by a person of limited skill.

DISCLOSURE OF INVENTION

These and other objects are achieved by a device for controlling an HVAC (heating, ventilation and air conditioning) system, such as an air conditioner, having an evaporator fan (or, in a heating system, a blower) and a compressor (or, in a heating system, a heating element) for a room, including (1) a door/window sensor to sense whether any of the door or windows are open or closed; (2) a fan relay to activate the evaporator fan; (3) a compressor relay to activate the compressor; (4) a system timer connected to the door/window sensor to deactivate the fan relay and the compressor relay, after a shutoff delay, when the door/window sensor indicates that any of the door and windows has been opened (with the fan and compressor remaining activated if the door and windows are closed within a time less than the shutoff delay); (5) a compressor timer that delays reactivation of the compressor for a startup delay after the compressor relay has been deactivated and that overrides the system timer when the door and windows have been closed for less than that startup delay.

Preferably, the relays are normally closed to allow the compressor and fan to operate.

With this device, if the door and windows have been opened for a time period less than the shutoff delay, the system timer prevents deactivation of the fan relay and the compressor relay. Thus, for example, if the shutoff delay is set for 15 seconds, opening and closing a door within 15 seconds (such as when entering and leaving the room) will not deactivate the fan or compressor.

If the door and windows have been opened for a period exceeding the shutoff delay and the startup delay, then the fan relay and compressor relay will be reactivated immediately when all of the door and windows are closed. Thus, if the shutoff delay is set for 15 seconds and the startup delay is set for five minutes, if the door and windows have been opened for a period longer than five minutes and 15 seconds, the fan and compressor will be reactivated immediately after the door and windows are closed.

However, if the door and windows are opened for longer than the shutoff delay (so that the fan and compressor have been turned off), but less than the startup delay (for example, five minutes), the compressor timer will prevent reactivation of the compressor until the expiration of the startup delay, thus preventing the compressor from being turned on and off more frequently than the startup delay allows. This prevents wear and tear on the compressor and reduces the need for maintenance that would be caused if the compressor were turned on and off more frequently than allowed by the startup delay.

Preferably, the shutoff delay can be preselected by setting the system timer, and the delay is preferably approximately 15 seconds, but can be in a range between 5 seconds and 1 minute. Preferably the startup delay can be preselected by setting the compressor timer and preferably the startup delay is approximately 5 minutes, but can range from 2 minutes to 10 minutes.

Optionally, an occupancy sensor can be provided to sense the presence of occupants in the room and an occupancy timer can be provided to deactivate the compressor relay and fan relay when the room has been unoccupied for an occupancy delay. Preferably the occupancy delay can be preselected by setting the occupancy timer, and preferably the occupancy delay is approximately 45 minutes, but can range from 30 minutes to 2 hours or more.

The occupancy sensor can be operatively connected to a secondary thermostat with selectable settings for the HVAC system for unoccupied rooms. Thus, when the room has been unoccupied for a period greater than the occupancy delay, the HVAC system is controlled by the secondary thermostat, but when the room is occupied again, the HVAC system will be controlled by the normal thermostat.

Preferably, for ease of maintenance and installation, the door/window sensors comprise at least one wireless door/windows sensor communicating with a receiver that is operationally connected to the timers. Preferably also, the occupancy sensor comprises a motion detector. The receiver and timers can be positioned anywhere in the building.

BEST MODES FOR CARRYING OUT INVENTION

The presently preferred best modes for carrying out the present invention are those illustrated by way of example in FIGS. 1 to 5.

Figure 1:
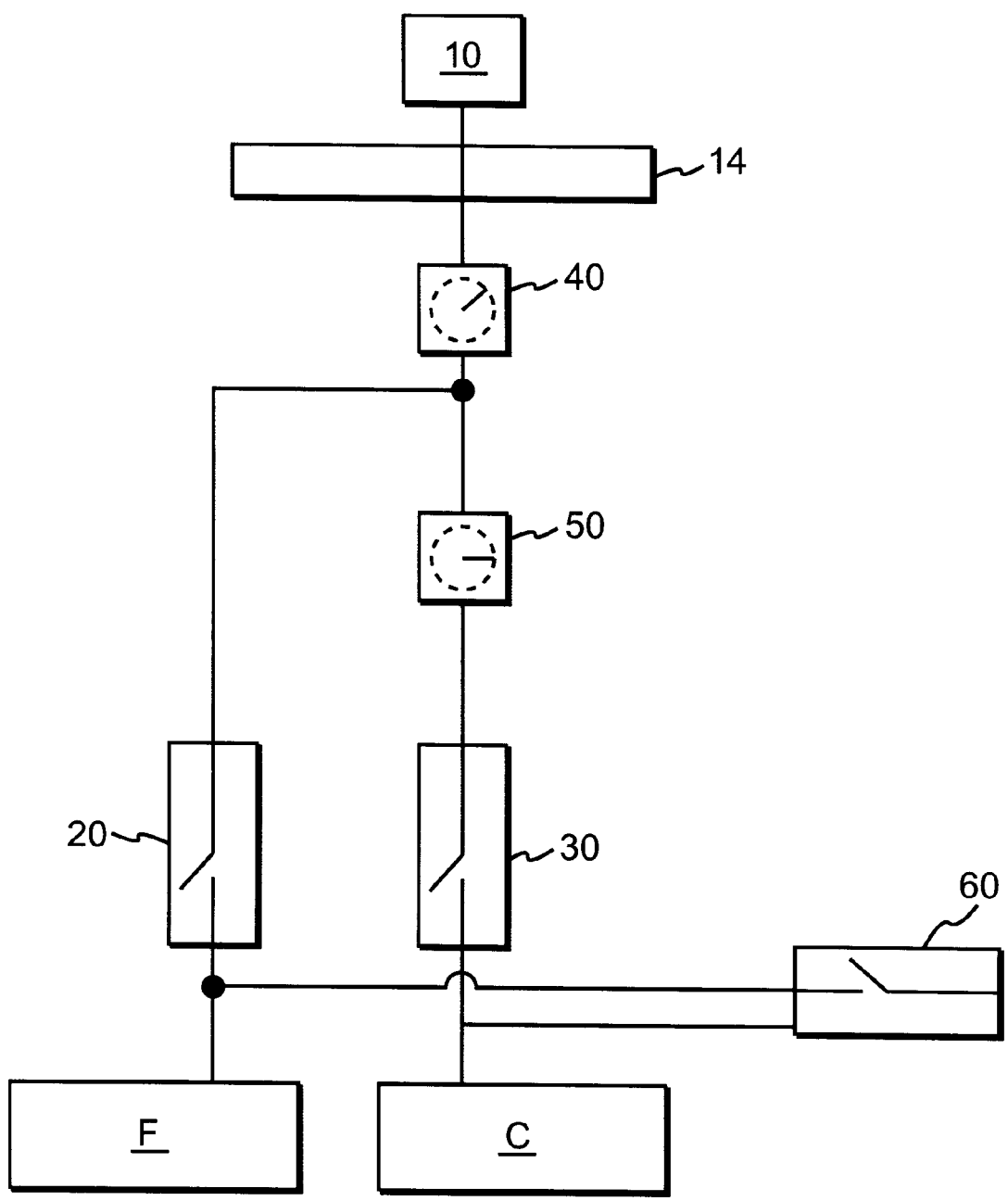
FIG. 1 is a schematic view of a presently preferred embodiment of the present invention.

Referring to FIG. 1, shown is a presently preferred embodiment of the present invention. Preferably a door/window sensor 10 is attached to each of the doors and windows in a room, to sense whether the doors and windows are opened or closed. Preferably the door/window sensors (only one of which is shown for simplicity) are wireless so as to avoid the time, costs and inconveniences of installing wires around the doors and windows. Being wireless also makes the system much easier to retrofit. Preferably the door/window sensors 10 transmit signals to a receiver 14 when a door or window is opened. Of course, the door/window sensors can also be wired, in which case the receiver 14 may be omitted.

The room is preferably provided with a HVAC (heating ventilation air conditioning) system comprising an evaporator fan (for air conditioning) or blower (for heating) F and a compressor (for air conditioning) or heating element (for heating) C. The evaporator fan F is preferably controlled by a fan relay 20 and the compressor C is preferably controlled by a compressor relay 30. For simplicity, the invention will be described in connection with an air conditioning system, but it is easily understood by a person of ordinary skill in the art that the blower can be substituted for the fan and the heating element can be substituted for the compressor in any heating system.

A system timer 40 is operatively connected to the receiver 14 and connected to the fan relay 20 and a compressor timer 50. The compressor timer 50 is operatively connected to the compressor relay 30. Preferably, a bypass relay 60 is also provided in order to manually bypass the entire system.

The system timer 40 provides a shutoff delay when deactivating which is preferably between approximately 5 and 30 seconds, and optimally approximately 15 seconds. However, the system timer should not provide any delay when reactivating. The compressor timer 50 provides a startup delay when deactivating of between approximately 1 minute and 10 minutes, and preferably approximately 5 minutes. However, the compressor timer should not provide any delay when reactivating after the startup delay has expired.

In operation, if a door or window is opened, the door/window sensor 10 sends a signal to the receiver 14, which then triggers the system timer 40. If the door or window is closed within the shutoff delay period, such as 15 seconds, then the system timer 40 resets and the fan relay 20 and the compressor relay 30 remain uninterrupted. However, if the open door or window is not closed after the shutoff delay, then the system timer 40 deactivates the fan relay 20 and the compressor relay 30 (thus deactivating both the fan F and the compressor C) and also starts the compressor timer 50 to count down the startup delay.

If the open door or window is closed after the shutoff delay, then the door/window sensor 10 sends a signal to the receiver 14, which then passes through the system timer 40 to (1) reactivate the fan relay 20; and (2) through the compressor timer 50, to reactivate the compressor relay 30. However, if the compressor timer 50 indicates that the startup delay has not expired, then the compressor timer 50 prevents reactivation of the compressor relay 30 until after the startup delay has also expired.

Thus, this system deactivates the fan F and the compressor C if any of the doors or windows are open for a period exceeding the shutoff delay. However, if the door and windows are open for a period less than the shutoff delay, then the fan F and compressor C are not deactivated. If the door and windows are all closed after expiration of the shutoff delay, then the fan F is reactivated. However, the compressor timer 50 prevents reactivation of the compressor C if the door and windows are all closed before expiration of both the shutoff delay and the startup delay. If the door and windows are closed after expiration of both the shutoff delay and the startup delay, then the compressor will be reactivated, preferably immediately, when the door and windows are closed. The system therefore prevents reactivation of the compressor C more frequently than allowed by the startup delay, thus avoiding the wear and tear and increased maintenance that would otherwise be caused.

Of course, the system timer 40 and compressor timer 50 can be configured to introduce delays in reactivation of the fan and compressor if desired.

If it is desired to bypass this entire system, then the bypass switch 60 can be closed.

Figure 2:
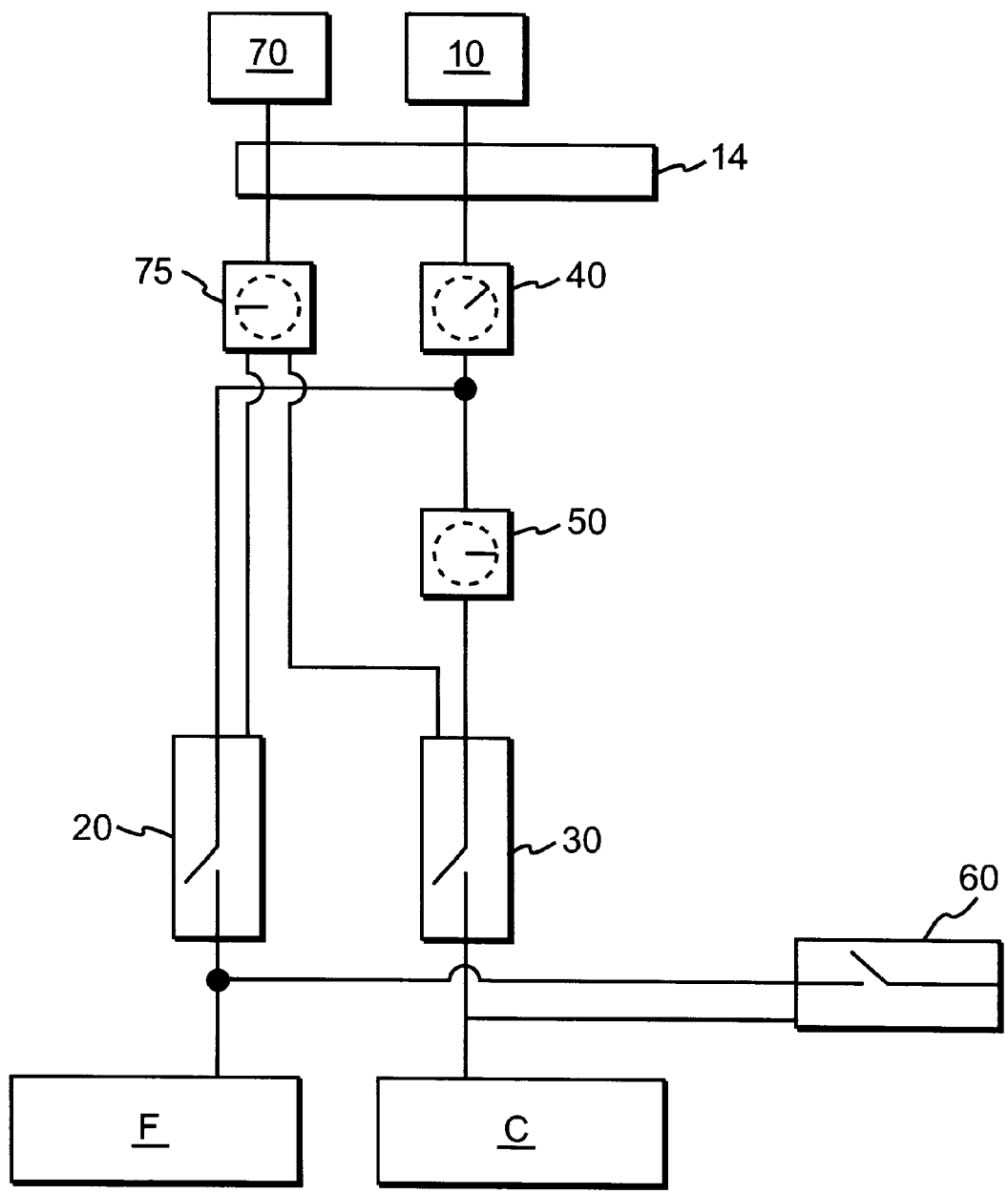
FIG. 2 is a schematic diagram of the embodiment of FIG. 2 and includes an optional occupancy sensor.

Referring to FIG. 2, shown is the embodiment of FIG. 1, with the addition of an occupancy sensor 70. Elements which are the same as in FIG. 1 are shown with the same reference numerals.

The occupancy sensor 70 is preferably an infrared motion detector and is also preferably wireless. The signal from the occupancy sensor is sent to the receiver 14, which then sends a signal to an occupancy timer 75 which is connected to both the fan relay 20 and compressor relay 30. The occupancy timer is then set to deactivate the fan relay 20 and compressor relay 30 if the room is unoccupied for an occupancy delay, such as 45 minutes. In this manner, if the room is unoccupied, the fan F and compressor C are deactivated. The occupancy timer is preferably set for an occupancy delay of 45 minutes, but the delay can be set at any time such as, for example, between 30 minutes and two hours, or more.

Figure 3:
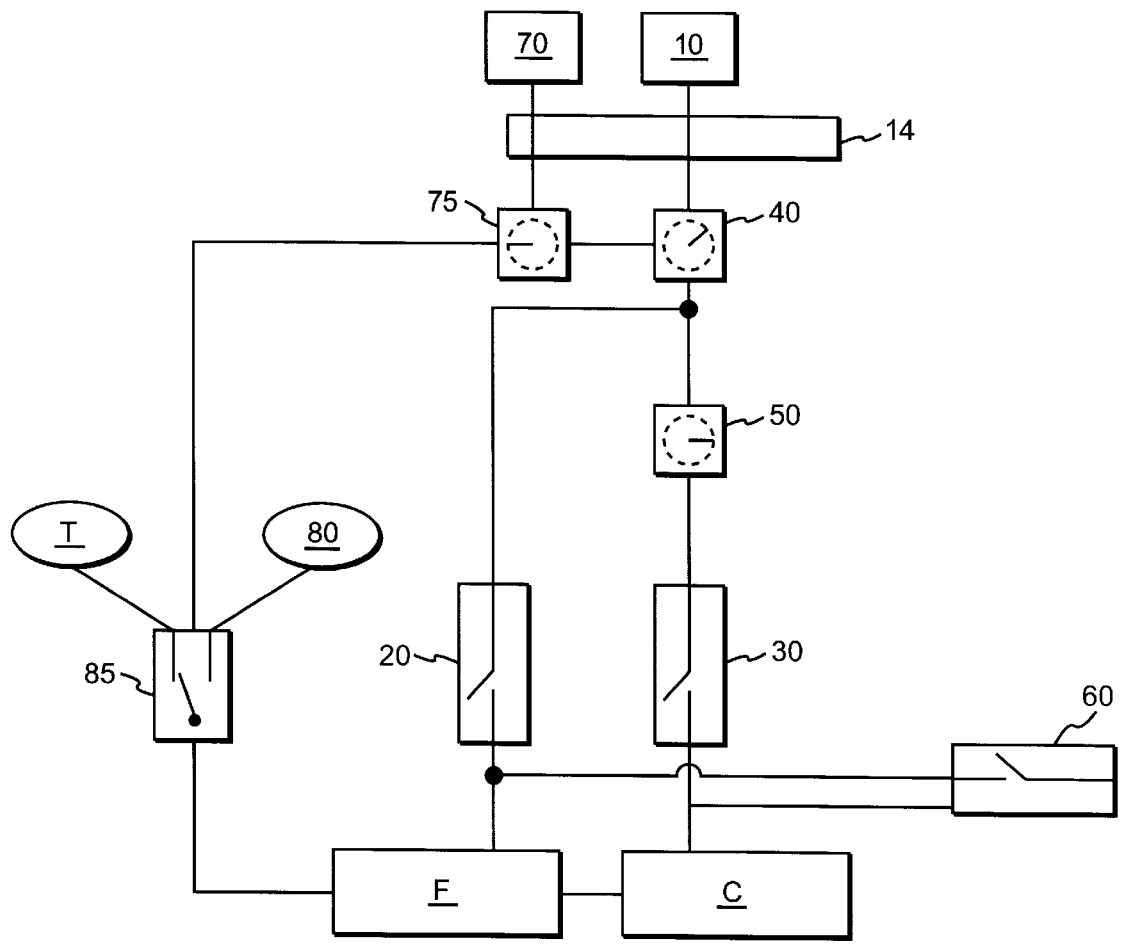
FIG. 3 is a schematic diagram of the presently preferred embodiment that includes an optional secondary thermostat.

Referring to FIG. 3, shown as the embodiment of FIG. 2 with the addition of a secondary thermostat 80 and a thermostat relay 85 that work in conjunction with the normally present primary thermostat T. Elements which are the same as in FIG. 2 are shown with the same reference numerals. In this embodiment, the fan F and compressor C are controlled by the primary thermostat T, as is conventional. However, if the occupancy sensor 70 and occupancy timer 75 indicate that the room has been unoccupied for the occupancy delay, then the thermostat relay 85 is activated to transfer control of the evaporator fan F and compressor C to the secondary thermostat 80. Preferably, the secondary thermostat would be set for energy saving temperatures. Thus, in this embodiment, if the room is unoccupied, the HVAC system is placed in an energy saving mode, instead of being turned off (as in the embodiment of FIG. 2). The primary thermostat T, the secondary thermostat 80 and the thermostat relay 85 can be connected to the fan F and compressor C in any suitable way (which would be within the skill of a person of ordinary skill in the art), and the connections shown in FIG. 3 are merely illustrative.

Figure 4:
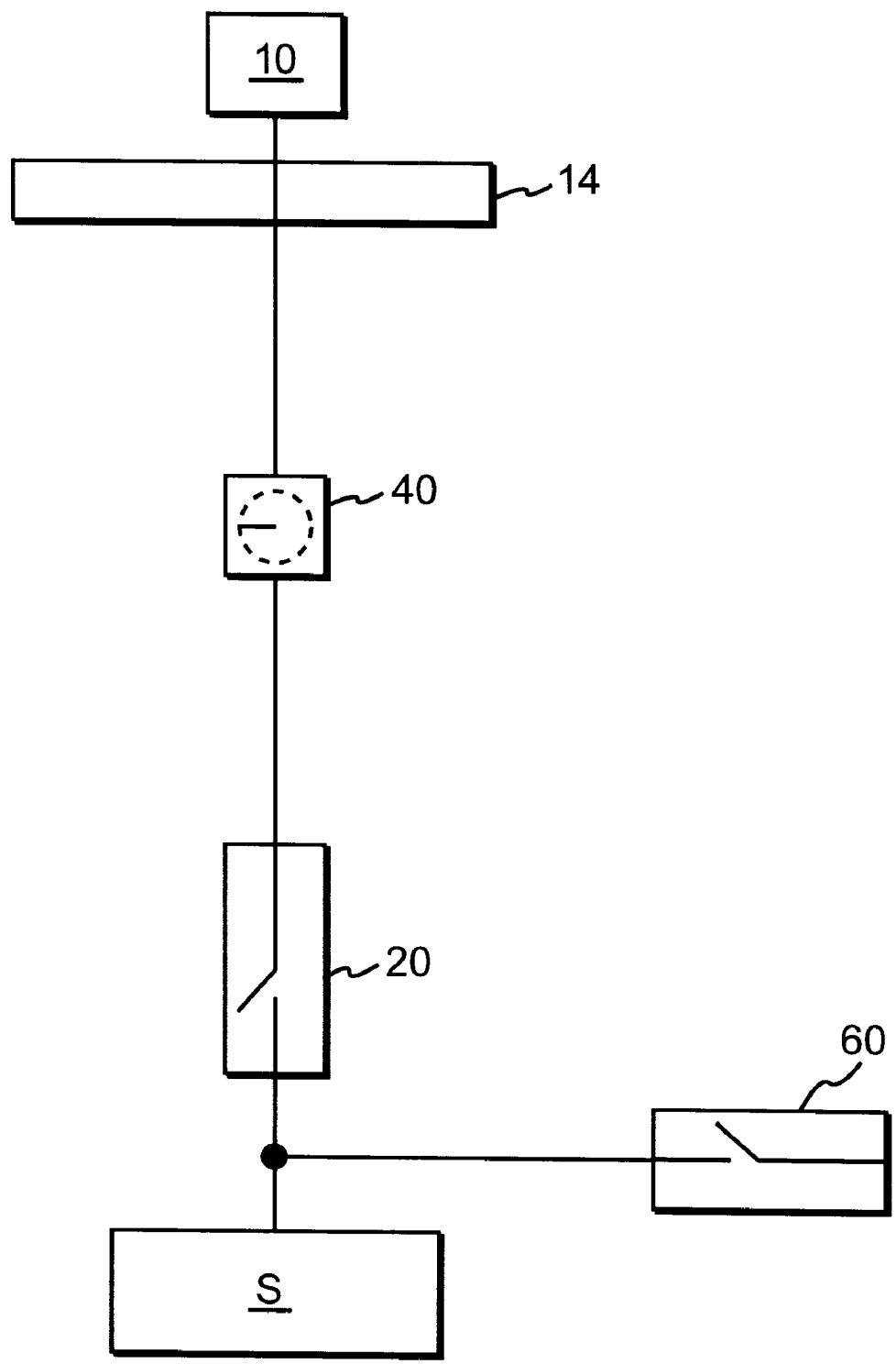
FIG. 4 is a schematic diagram of an alternative embodiment of the present invention as adapted for use in a chilled water solenoid cooling system.

Referring to FIG. 4, shown is an alternative embodiment of the present invention for a HVAC system which uses chilled or heated water that circulates to the rooms in which the room temperature is controlled by a thermostat (not shown) that controls a solenoid S to start and stop circulation of the water through coils in the room. A fan (not shown) is activated at the same time as the solenoid S in order to circulate air from the room through the coils. As can be seen in this embodiment, only a system timer is necessary, to turn off the solenoid S and fan if the door or windows are open for more than the shutoff delay period.

Figure 5:
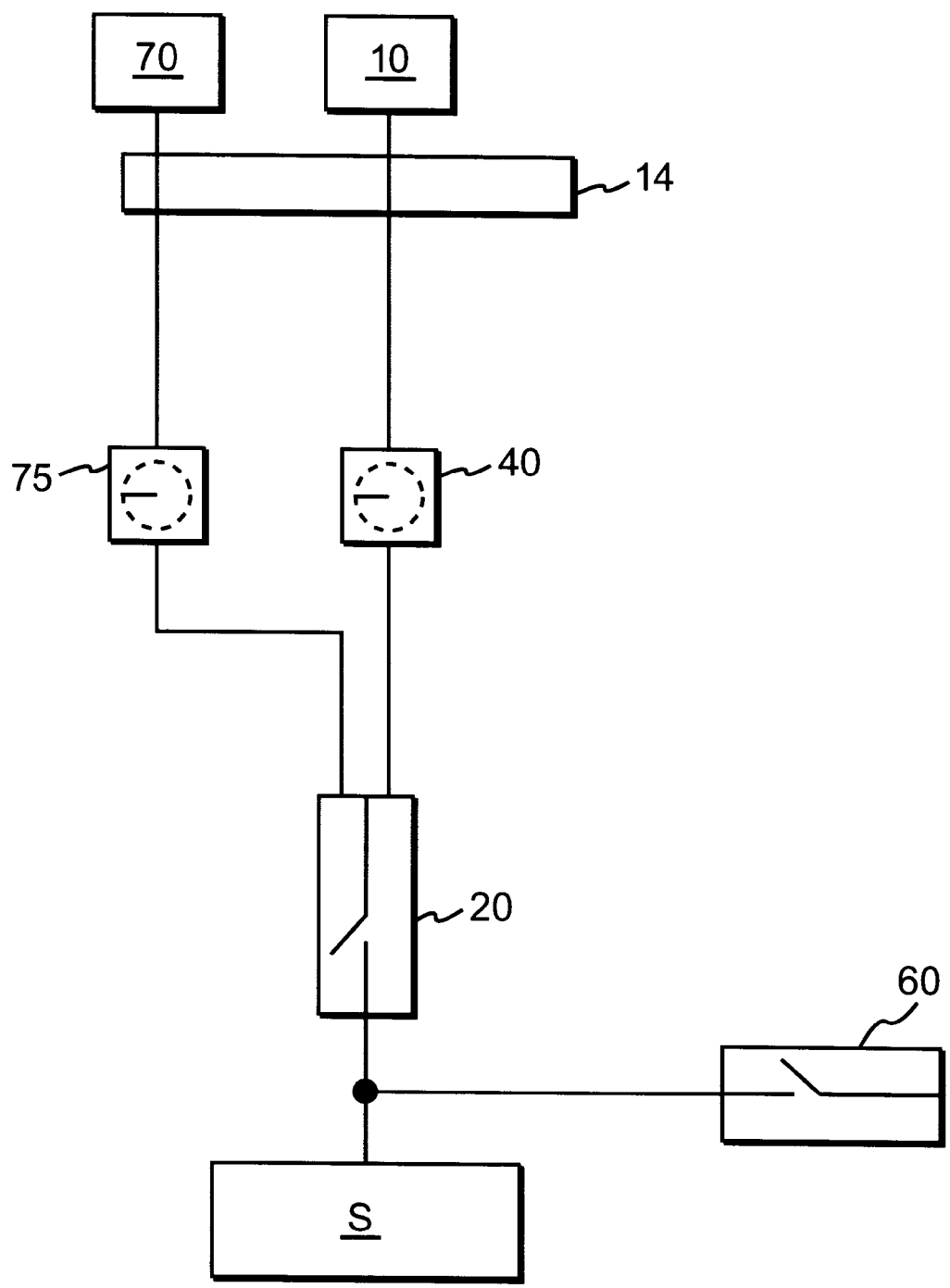
FIG. 5 is a schematic diagram of the alternative embodiment of FIG. 4 that includes an occupancy sensor.

Referring to FIG. 5, shown is the embodiment of FIG. 4, with the addition of an occupancy sensor 70 and occupancy timer 75, which operate in the same manner in connection with this embodiment as in the embodiment of FIG. 2.

As can be seen from all these embodiments, opening and closing of doors and windows for less than the shutoff delay time does not affect the HVAC unit. However, if doors or windows are open for a period exceeding the shutoff delay, then the HVAC unit is turned off. If all the doors and windows are later closed, then the HVAC unit is reactivated, but the compressor is reactivated only if the doors and windows have all been closed for longer than the shutoff delay and an additional startup delay. This delayed startup of the compressor reduces the wear and tear and maintenance on the compressor because it will not be starting and stopping as often as it would if no such startup delay were provided.

While the present invention has been disclosed in connection with the presently preferred embodiments described herein, it should be understood that there may be other embodiments which fall within the spirit and scope of the invention as defined by the claims. Thus, any system that provides a startup delay to prevent the compressor (or heating element) from reactivating more frequently than allowed by the startup delay would be within the scope of this invention, regardless of the particular configuration of sensors, timers, relays and other elements. Accordingly, no limitations are to be implied or inferred in this invention except as specifically and explicitly set forth in the claims.

What is claimed is:

1. A device for controlling an air conditioner having an evaporator fan and a compressor for a room having a door and at least one window, comprising:

a door/window sensor operatively connected to each of said door and windows to sense whether any of said door and window is open;

a fan relay operatively connected to said evaporator fan to activate said fan when said fan relay is activated, and to deactivate said fan when said fan relay is deactivated;

a compressor relay operatively connected to said compressor to activate said compressor when said compressor relay is activated, and to deactivate said compressor when said compressor relay is deactivated;

a system timer operatively connected to said door/window sensor, to said fan relay, and to said compressor relay, to deactivate said fan relay and said compressor relay a shutoff delay after said door/window sensor senses that any of said door and windows has been opened, and to maintain said fan and said compressor activated if said open door or window is closed within less than said shutoff delay after being opened, wherein said shutoff delay can be preselected by setting said system timer;

a compressor timer operatively connected to said system timer and to said compressor relay to delay any reactivation of said compressor relay for a startup delay after said compressor relay has been deactivated, wherein said startup delay can be preselected by setting said compressor timer;

whereby if said open door or window is closed less than said shutoff delay after being opened, said system timer prevents deactivation of said fan relay and of said compressor relay;

whereby if said open door or window is closed a time between said shutoff delay and said startup delay after being opened, said compressor timer delays reactivation of said compressor relay until shutoff delay and said startup delay have both expired; and whereby if said door and windows are closed a time exceeding said shutoff delays and said startup delay after being opened, said fan relay and said compressor relay are reactivated immediately after said open door or window is closed.

2. A device according to claim 1, further comprising:

an occupancy sensor to sense the presence of occupants in said room;

an occupancy timer operatively connected to said occupancy sensor, said fan relay and said compressor relay, to deactivate said compressor relay and said fan relay when said room has been unoccupied for an occupancy delay, wherein said occupancy delay can be preselected by setting said occupancy timer, and whereby said fan relay and said compressor relay are reactivated immediately after said occupancy sensor senses the presence of occupants in said room.

3. A device according to claim 1, wherein said door/window sensor comprises at least one wireless door/window sensor.

4. A device according to claim 1, wherein said occupancy sensor comprises a motion detector.

5. A device according to claim 1, wherein said shutoff delay is approximately 5 seconds to approximately 60 seconds, said startup delay is approximately 2 minutes to approximately 15 minutes, and said occupancy delay is approximately 15 minutes to approximately 90 minutes.

6. A process for controlling an air conditioner having an evaporator fan and a compressor for a room having a door and at least one window, comprising:

deactivating said fan and said compressor if any of said door and window are open for a period exceeding a shutoff delay;

preventing deactivation of said fan and compressor if any of said door and window are open for a period less than said shutoff delay;

reactivating said fan if said door and window are all closed after expiration of said shutoff delay;

preventing reactivation of said compressor if said door and window are all closed before expiration of said shutoff delay and of a startup delay after being opened;

reactivating said compressor if said door and window are all closed after expiration of said shutoff delay and of said startup delay.

7. A device for controlling a heating system having a blower and a heating element for a room having a door and at least one window, comprising:

a door/window sensor operatively connected to each of said door and windows to sense whether any of said door and window is open;

a blower relay operatively connected to said blower to activate said blower when said blower relay is activated, and to deactivate said blower when said blower relay is deactivated;

a heating element relay operatively connected to said heating element to activate said heating element when said heating element relay is activated, and to deactivate said heating element when said heating element relay is deactivated;

a system timer operatively connected to said door/window sensor, to said blower relay, and to said heating element relay, to deactivate said blower relay and said heating element relay a shutoff delay after said door/window sensor senses that any of said door and windows has been opened, and to maintain said blower and said heating element activated if said open door or window is closed within less than said shutoff delay after being opened, wherein said shutoff delay can be preselected by setting said system timer;

a heating element timer operatively connected to said system timer and to said heating element relay to delay any reactivation of said heating element relay for a startup delay after said heating element relay has been deactivated, wherein said startup delay can be preselected by setting said heating element timer;

whereby if said open door or window is closed less than said shutoff delay after being opened, said system timer prevents deactivation of said blower relay and of said heating element relay;

whereby if said open door or window is closed a time between said shutoff delay and said startup delay after being opened, said heating element timer delays reactivation of said heating element relay until said shutoff delay and said startup delay have both expired; and whereby if said door and windows are closed a time exceeding said shutoff delay and said startup delay after being opened, said blower relay and said heating element relay are reactivated immediately after said open door or window is closed.

* * * * *